(12) United States Patent
Bissonnette

(10) Patent No.: US 10,315,266 B2
(45) Date of Patent: Jun. 11, 2019

(54) CUTTING NOZZLE FOR A POSTMIXED OXY-FUEL GAS TORCH

(71) Applicant: OXY-ARC INTERNATIONAL, INC., Cornwall (CA)

(72) Inventor: Claude Bissonnette, Cornwall (CA)

(73) Assignee: OXY-ARC INTERNATIONAL, INC., Cornwall (CA)

( * ) Notice: Subject to any disclaimer, the term of this patent is extended or adjusted under 35 U.S.C. 154(b) by 189 days.

(21) Appl. No.: 15/429,882

(22) Filed: Feb. 10, 2017

(65) Prior Publication Data

US 2017/0225251 A1    Aug. 10, 2017

Related U.S. Application Data

(60) Provisional application No. 62/293,488, filed on Feb. 10, 2016.

(51) Int. Cl.
| | |
|---|---|
| *B23K 7/00* | (2006.01) |
| *F23D 14/42* | (2006.01) |
| *F23D 14/32* | (2006.01) |
| *F23D 14/54* | (2006.01) |

(52) U.S. Cl.
CPC .............. *B23K 7/002* (2013.01); *F23D 14/32* (2013.01); *F23D 14/42* (2013.01); *F23D 14/54* (2013.01); *Y02E 20/344* (2013.01)

(58) Field of Classification Search
CPC ..................................................... B23K 7/002
See application file for complete search history.

(56) References Cited

U.S. PATENT DOCUMENTS

| | | | |
|---|---|---|---|
| 6,277,323 B1 | 8/2001 | Bissonnette | |
| 2013/0038001 A1* | 2/2013 | Lotz | F23D 14/54 266/48 |
| 2017/0225251 A1* | 8/2017 | Bissonnette | B23K 7/002 |

* cited by examiner

*Primary Examiner* — Scott R Kastler
(74) *Attorney, Agent, or Firm* — Norton Rose Fulbright Canada LLP

(57) ABSTRACT

A cutting nozzle for a gas torch, such as a postmixed oxy-fuel gas torch, comprising a body with a torch end adapted to engage the gas torch, a discharge end, and a peripheral surface between the torch end and the discharge end. The body has a plurality of bores for respectively conducting fuel gas, preheat oxygen and cutting oxygen through the nozzle, each of the plurality of bores extending from the torch end and terminating in a respective discharge orifice at the discharge end of the body. A set of the plurality of bores are preheat oxygen bores connected to an oxygen source at the torch end for discharging the preheat oxygen at the discharge end. A plurality of air bores each have an inlet orifice located on the peripheral surface of the body and open to an air source, and a discharge orifice in or proximal to the discharge end.

19 Claims, 4 Drawing Sheets

CUTTING NOZZLE FOR A POSTMIXED OXY-FUEL GAS TORCH

CROSS-REFERENCE TO RELATED APPLICATION

The present application claims priority on U.S. Provisional Application Ser. No. 62/293,488 filed on Feb. 10, 2016, and incorporated herewith by reference.

FIELD OF THE APPLICATION

The present application relates to oxy-fuel gas torches and, in particular, to a cutting nozzle for gas torches such as postmixed oxy-fuel gas torches.

BACKGROUND OF THE ART

Oxy-fuel gas cutting torches are commonly used for cutting ferrous alloys and some non-ferrous metals, as cuts can be effected through very thick billets. In operation, an oxy-fuel torch directs an ignited stream of oxygen and fuel gas onto the surface of the metal to be cut. The metal is thus heated to its ignition temperature, at which point a stream of cutting oxygen directed at the surface oxidizes the heated metal to effect the cut.

The cutting torch may be one of a premixed or a postmixed type torch. In a premixed torch, preheat oxygen and fuel gas are mixed within the torch head before being discharged for ignition. In a postmixed cutting torch, the preheat oxygen and fuel gas are discharged from the torch in unmixed streams. Turbulence in the discharged streams mixes the oxygen and fuel gas before ignition occurs. A principal advantage of the postmixed cutting torch is that it is not subject to flashback, a potential hazard associated with the use of premixed torches. Flashback occurs when the oxygen and fuel gas mixture in a premixed torch ignites within the torch head. Postmixed torches are therefore commonly employed for heavy industrial applications where a torch is subjected to considerable heat. A further advantage of the postmixed torch is that postmixed nozzles produce a longer and wider heat zone than premixed nozzles. This permits the postmixed torch to operate farther from the work, decreasing the heat stress on the torch and increasing the service life of the nozzle.

Many prior art postmixed nozzles for oxy-fuel gas torches operate in substantially the same way. A stream of cutting oxygen is discharged from an axial bore in the nozzle. A plurality of fuel gas discharge orifices arranged in a concentric ring around the axial bore discharge preheat fuel gas and a second plurality of gas discharge orifices arranged in an outer concentric ring discharge preheat oxygen which acts as an envelope that surrounds the fuel gas stream. As the gas streams flow toward the workpiece, a mixing of the fuel gas and the oxygen occurs and the mixture ignites to heat the workpiece.

An example of a prior art postmixed oxy-fuel gas cutting torch and nozzle is taught in the U.S. Pat. No. 6,277,323 which issued to Bissonnette on Aug. 21, 2001. That patent describes a combination cutting torch and nozzle assembly for postmixed oxy-fuel cutting using an annular streams of preheat oxygen gas surrounding a fuel gas stream. The nozzle assembly is secured to the head of the cutting torch by a hollow retaining nut which forms an annular gap with the nozzle assembly for discharging the outer preheat oxygen gas stream. The preheat oxygen gas is connected to a pure oxygen source (e.g., 99%+purity), and therefore discharges a sizable volume of pure oxygen during operation, to ensure a high flame temperature. Hence, pure oxygen consumption is an important cost factor in the operation of postmixed oxy-fuel gas cutting torches.

SUMMARY OF THE APPLICATION

It is therefore an aim of the present disclosure to provide a cutting nozzle for postmixed oxy-fuel gas torches that addresses issues related to the prior art.

Therefore, in accordance with the present application, there is provided a cutting nozzle for a gas torch, the nozzle comprising: a body comprises a torch end adapted to engage the gas torch, a discharge end, and a peripheral surface between the torch end and the discharge end, the body having a plurality of bores for respectively conducting fuel gas, preheat oxygen and cutting oxygen through the nozzle, each of the plurality of bores extending from the torch end and terminating in a respective discharge orifice at the discharge end of the body; a set of the plurality of bores being preheat oxygen bores connected to an oxygen source at the torch end for discharging the preheat oxygen at the discharge end; and a plurality of air bores, each of the air bores having an inlet orifice located on the peripheral surface of the body and open to an air source, and a discharge orifice in or proximal to the discharge end.

DESCRIPTION OF THE PREFERRED EMBODIMENTS

Figure 1:
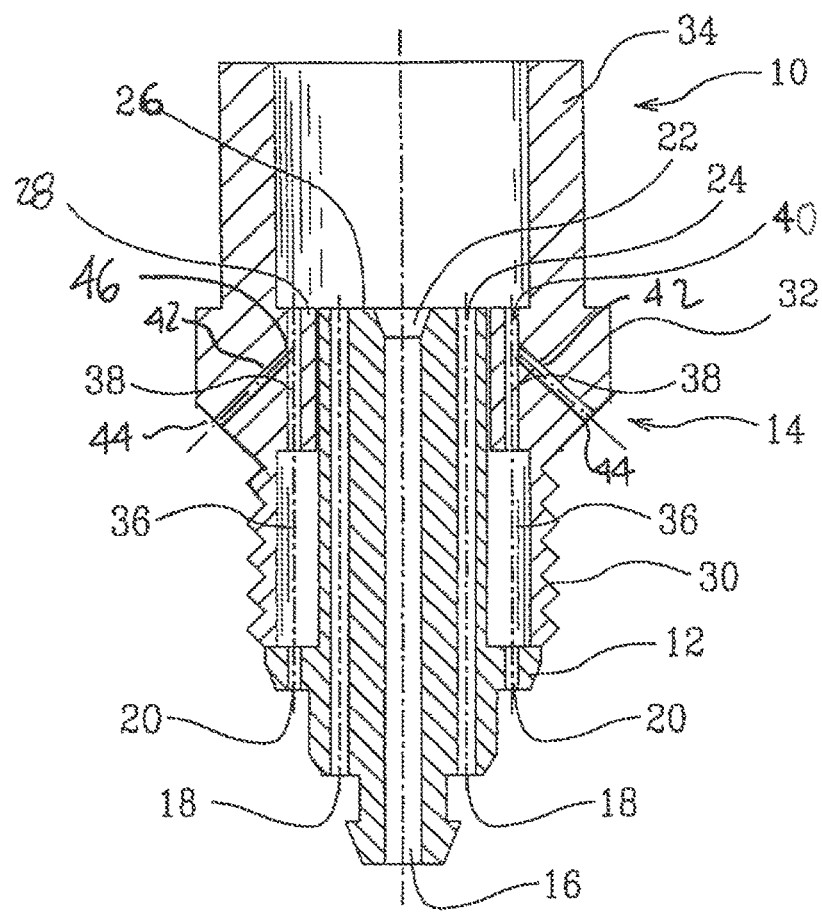
FIG. 1 is longitudinal cross-sectional view of a cutting nozzle in accordance with an embodiment of the present disclosure.

Referring to the drawings and more particularly to FIG. 1, there is illustrated a longitudinal cross-sectional view of a cutting nozzle 10 in accordance with an embodiment of the present disclosure. The cutting nozzle 10 may also be referred to as a cutting nozzle assembly as it includes a nozzle tip 12 and a hollow retainer nut 14. The cutting nozzle 10 has a torch end by which it is connected to a cutting torch, and a discharge end, at which gases are discharged. A body of the cutting nozzle 10 defines a peripheral outer surface that is between the torch end and the discharge end and, in some embodiments, the peripheral surface is exposed to an environment while the torch end is secured to a torch, as in FIG. 4. The nozzle tip 12 includes an axial bore 16 for discharging cutting oxygen from the cutting torch as detailed hereinafter. A plurality of fuel gas bores 18 are arranged in an inner concentric ring around the axial bore 16. Likewise, a plurality of preheat oxygen bores 20 are arranged in an outer concentric ring around the axial bore 16. Each of the bores 16 and 18 terminates in a discharge orifice 22 and 24 respectively in a discharge end 26 of the cutting nozzle 10. The discharge end 26 may be substantially flat, such that the discharge orifices 22 and 24 are in a common plane. As shown in FIG. 1, the inlets of the bores 16, 18 and 20 may be in surfaces of the torch end lying in planes to which a vector of the longitudinal axis is normal.

The retainer nut 14 surrounds the nozzle tip 12 and is used to couple it with a cutting torch. An annular flange 28 is located in an inner periphery of the retainer nut 14 and forms a portion of the discharge end 26 of the cutting nozzle 10. The retainer nut 14 may have a spiral thread 30, a hexagonal rib 32 to provide a gripping surface for a wrench, and a shroud 34 which surrounds the orifices in and extends away from the discharge end 26 of the cutting nozzle 10. The shroud 34 is preferably a circular cylinder although other tubular shapes may also be used.

As described above, the retainer nut 14 forms a part of the discharge end 26 of the cutting nozzle 10. The hollow retainer nut 14 surrounds the nozzle tip 12. The preheat oxygen bores 20 in the nozzle tip 12 communicate with an annular cavity 36 formed between the nozzle tip 12 and the retainer nut 14. The annular flange 28 of the retainer nut 14 is provided with preheat oxygen bores 38 which communicate with preheat oxygen discharge orifices 40. Thus, preheat oxygen entering preheat oxygen bores 20 passes through the cavity 36 in the retainer nut 14 and exits through the preheat oxygen bores 38 via the preheat oxygen discharge orifices 40.

Air bores 42 extend from an exterior of the nut 14 to the preheat oxygen bores 38. The air bores 42 each have an inlet orifice 44 open to ambient air, while a discharge orifice 46 discharges air drawn via the inlet orifice 44 into a flow of preheat oxygen directed to the discharge orifices 40, thus proximal to the discharge end of the cutting nozzle 10. The air bores 42 are oriented relative to the preheat oxygen bores 38 in such a way that ambient air is drawn by the flow of preheat oxygen into the preheat oxygen bores 38, to mix with the preheat oxygen. Hence, the preheat oxygen discharge orifices 40 exhaust a mixture of pure oxygen and air. No additional motive force may be required, as the Venturi effect is sufficient to draw a non-negligible volume of air into the preheat oxygen bores 38. The air bores 42 may be straightforward drilled bores in the nut 40. In another embodiment, the discharge orifices of the air bores 42 extend into discharge end, for instance when compressed air is fed to the air bores 42 and Venturi effect is not necessary.

Figure 5C:
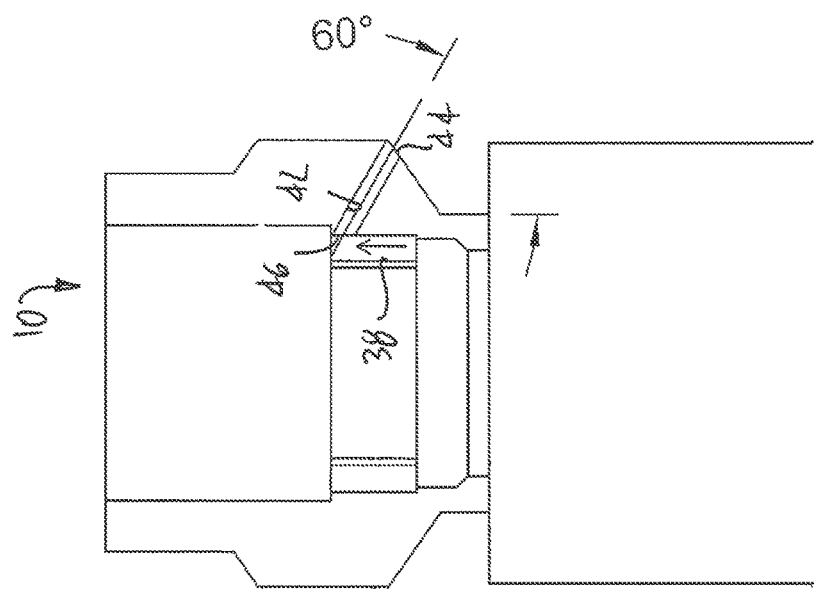
FIGS. 5A, 5B and 5C are schematic views showing various angles for air bores relative to preheat oxygen bores in the cutting nozzle of FIG. 1, in accordance with the present disclosure.
Figure 5B:
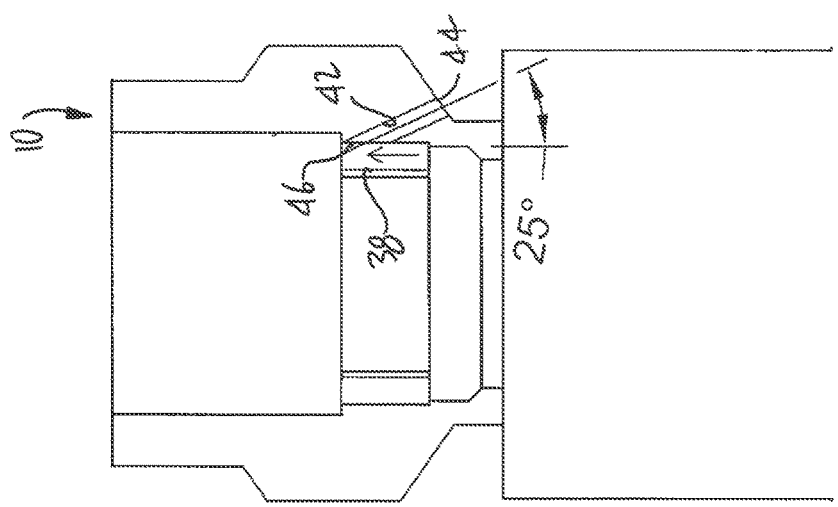
Figure 5A:
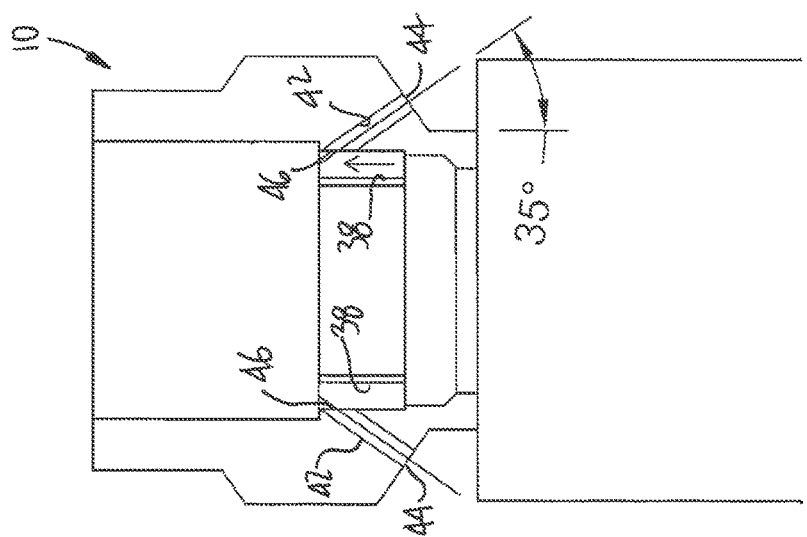

An orientation of each of the air bores 42, i.e., represented by its main axis, is oblique relative to an orientation of each of the oxygen bores 38, i.e., also represented by its main axis. Different angular arrangements are considered, including a substantially transverse arrangement between the air bores 42 and the oxygen bores 38. For example, referring to FIGS. 5A to 5C, different angles for the air bores 42 are illustrated, relative to the preheat oxygen bores 38. Although the shown angles range from 25° to 60°, it is contemplated to go as high as 90° in some embodiments. However, care should be taken to avoid pure oxygen loss through the air bores 42. The axial faces of the hexagonal rib 32 may be angled in the manner shown in FIG. 1 instead of being normal to a longitudinal axis of the cutting nozzle 10, to space the inlet orifice 44 from a body of the spiral thread 30 of nut 14. In such a case, the inlet orifices 44 are in a flaring segment of the peripheral surface of the body of the cutting nozzle 10. The flaring segment flares toward the discharge end and may merge with the hexagonal rib 32 as in FIG. 1. The flaring segment may be frusto-conical in shape.

Figure 4:
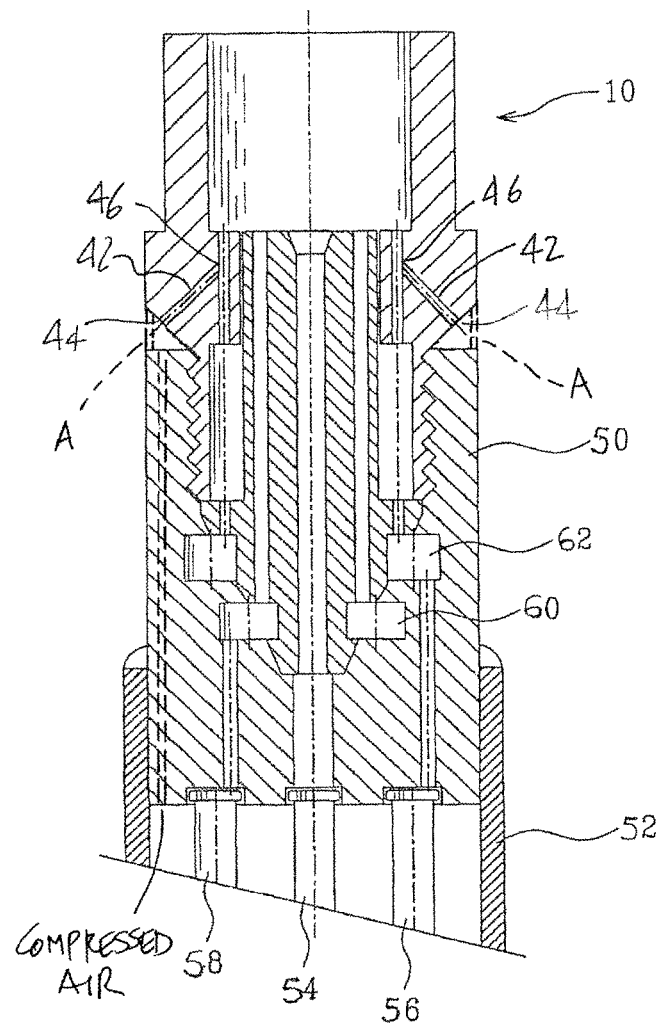
FIG. 4 is a longitudinal cross-sectional view of a cutting torch featuring the cutting nozzle of FIG. 1.

During combustion, the addition of the air bores 42 may result in a temperature increase of the flame for a same volume of pure oxygen. Accordingly, to maintain the same flame temperature as prior art embodiments without the air bores 42, the volume of pure oxygen is reduced as air compensates for the reduction in pure oxygen. In order to assist in increasing air volume in the preheat oxygen stream, it is also contemplated to connect the inlet orifices 44 to a source of compressed air. For example, as schematically shown in FIG. 4, a sleeve A (a.k.a. jacket) could form a common plenum around the inlet orifices 44, this plenum being connected to a compressed air source. This is one of multiple configurations considered to supply compressed air to the air bores 42.

Figure 2:
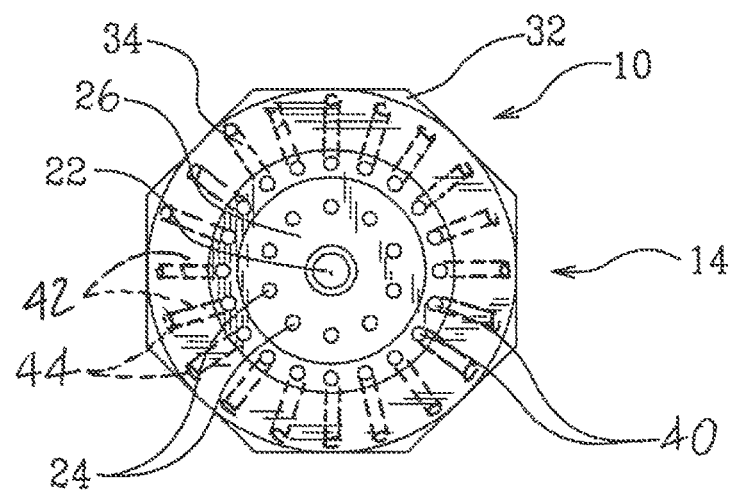
FIG. 2 is an end view of the cutting nozzle of FIG. 1.

FIG. 2 shows a top plan view of the cutting nozzle 10 shown in FIG. 1. As is apparent, the hexagonal rib 32 of the retainer nut 14 provides a gripping surface for a wrench to facilitate the coupling of the cutting nozzle to a torch. The shroud 34 surrounds the discharge end 26 of the cutting nozzle. The discharge end 26 includes discharge orifices 22 for cutting oxygen, 24 for fuel gas and 40 for preheat oxygen. The discharge orifice 22 for cutting oxygen may be flared. This flaring may create a swirl effect within the interior of the shroud 34 to promote the mixing of fuel gas and oxygen. The shroud 34 also shields the discharge end 28 from molten metal splashed back from the cut. This enhances the service life of the nozzle 10 because it substantially eliminates nozzle damage resulting from splash back metal contacting the nozzle and fusing with it.

It is observed that the cutting nozzle 10 has an air bore 42 for each oxygen bore 38. If a reduced air contribution is required, some of the oxygen bores 38 may be without air bores 42, or some oxygen bores 38 may be plugged. The embodiment of FIGS. 1 and 2 shows twenty oxygen bores 38 and twenty air bores 42, although a greater or lesser number of such bores 38 and 42 may be present. In an embodiment, a plurality of the oxygen bores 38 are paired with one of the air bores 42.

Figure 3:
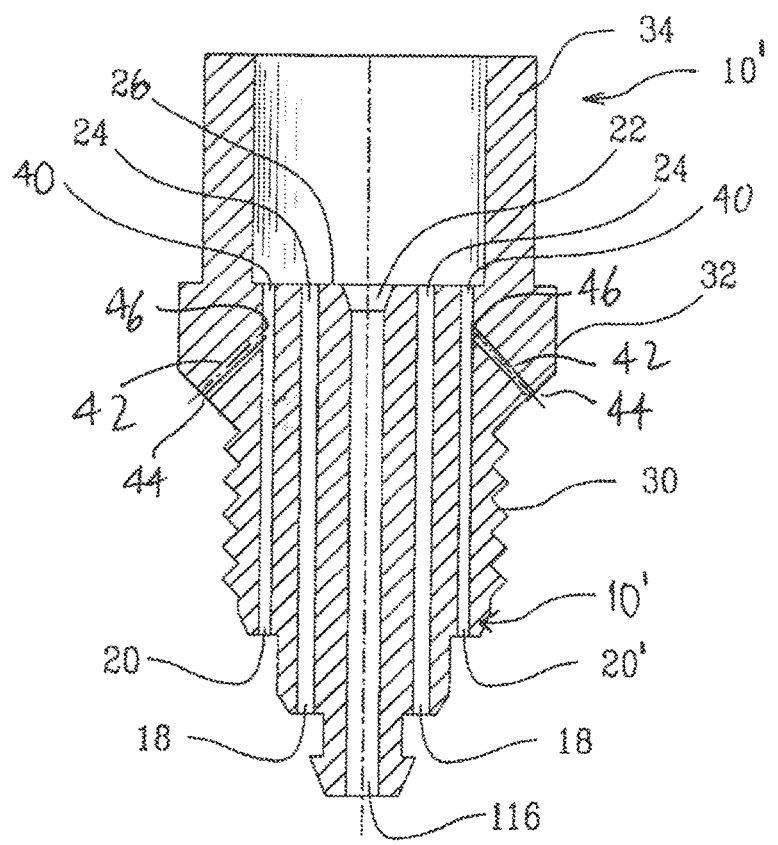
FIG. 3 is longitudinal cross-sectional view of a cutting nozzle in accordance with an embodiment of the present disclosure.

FIG. 3 is a longitudinal cross-section of a cutting nozzle 10' in accordance with another embodiment of the present disclosure. The cutting nozzle 10' is substantially identical in structure to the assembly 10 shown in FIGS. 1 and 2, whereby like elements bear like reference numerals. In this embodiment, the entire cutting nozzle 10' of FIG. 3 is conveniently manufactured from a single piece of bar stock, such as, for example, commercially available 1.25" hexagonal copper bar stock. In this case, there is no nozzle tip 12 separable from the nut 14, as these two components are a single unitary piece, a.k.a. a monolithic or monoblock piece. The nozzle 10' includes all of the discharge bores described above, including the preheat oxygen bores 20' extending all the way to the discharge end 26, with the air holes 42 converging to the preheat oxygen holes 20' in venturi fashion. Hence, the assembly 10' does not have the annular cavity 36 or the preheat oxygen bores 38. The cutting oxygen discharge orifice 22, the fuel gas discharge orifices 24 and the preheat oxygen discharge orifices 40 are all located in the discharge end 28 of the nozzle 10', and may hence all be in a common plane if the discharge end 28 is flat. In all other respects, the cutting nozzle 10', as shown in FIG. 3, is similar to the cutting nozzle 10 shown in FIGS. 1 and 2. This embodiment requires slightly more material to manufacture as well as more machining time.

In the embodiment of FIG. 3, the shroud would conveniently be provided as an axial bore in one end of the nozzle blank. The exterior surface of the shroud can be turned (e.g. on a lathe) to provide a circular cylindrical surface as shown in the illustrated embodiments, or alternatively, left in its original hexagonal shape. Such a configuration would avoid producing the hollow retainer nut 14 shown in FIGS. 1 and 3, which requires material removal therefrom to form a cavity to receive the nozzle tip 12. The unitary nozzle, therefore, would require less machining time and would decrease material waste.

Cutting nozzles 10 and 10' may be preferably constructed from brass alloy, although other materials such as copper, stainless steel and the like may also be used. The shroud 34 is preferably at least 0.65" (16.5 mm) long. Longer shrouds may be used but much shorter lengths are not recommended. The thickness of the sidewall of the shroud 34 is preferably about 0.22" (5.58 mm) for good resistance to heat fatigue although a thinner sidewall may be used successfully. At least the outer surface of the sidewall of the shroud 34 is preferably plated with chrome or nickel to inhibit the adhesion of metal molten splash back.

FIG. 4 shows the cutting nozzle 10 illustrated in FIG. 1 connected to a typical postmixed oxy-fuel gas torch, and the connection with the cutting nozzle 10' would be similar. The oxy-fuel gas torch includes a torch head 50 to which the cutting nozzle 10 is coupled using the retainer nut 14. The torch head 50 is supported by a tubular handle 52. The tubular handle 52 is hollow. Extending through the tubular handle are supply tubes for cutting oxygen, fuel gas and preheat oxygen. Supply tube 54 supplies cutting oxygen from an oxygen source. Supply tube 56 supplies fuel gas from a fuel gas source. Supply tube 58 supplies preheat oxygen from the oxygen source. The fuel gas supply tube 56 and the cutting oxygen supply tube 58 may terminate in circumferential (e.g., annular) distribution grooves 60 and 62, respectively.

The cutting nozzle 10/10' for a postmixed oxy-fuel gas torch in accordance with the present disclosure is useful in cutting steel and other ferrous and some non-ferrous alloys, particularly in industrial production environments such as steel mills where large slabs must be cut into billets for handling or processing. Because the cutting nozzle 10/10' provides a cleaner and narrower cut than prior art nozzles of the same type, the nozzle conserves materials and energy. Moreover, the operation of the cutting nozzles 10/10' offers a reduction in pure oxygen consumption, due to the use of ambient air as part of the preheat oxygen. The cutting nozzle 10 in accordance with the invention may be used in any application where metals must be rapidly and efficiently cut by oxidation.

The embodiments described above are intended to be exemplary only. Those skilled in the art will understand that certain prior art postmixed nozzle constructions may be modified to accord with the invention by welding or soldering a shroud to either the retainer nut or the discharge end of the prior art nozzle or by redesigning a retainer nut to include an integral shroud. Moreover, the cutting nozzle is described as being used with a postmixed oxy-fuel gas torch, but may also be used in other types of torches as well. Changes and modifications to the specifically described embodiments may be made without departing from the scope of the invention which is intended to be limited solely by the scope of the appended claims.

The invention claimed is:

1. A cutting nozzle for a gas torch, the nozzle comprising:
a body comprises a torch end adapted to engage the gas torch, a discharge end, and a peripheral surface between the torch end and the discharge end, the body having a plurality of bores for respectively conducting fuel gas, preheat oxygen and cutting oxygen through the nozzle, each of the plurality of bores extending from the torch end and terminating in a respective discharge orifice at the discharge end of the body;
a set of the plurality of bores being preheat oxygen bores connected to an oxygen source at the torch end for discharging the preheat oxygen at the discharge end; and
a plurality of air bores, each of the air bores having an inlet orifice located on the peripheral surface of the body and open to an air source, and a discharge orifice connected to a respective one of the preheat oxygen bores, whereby air is drawn into the preheat oxygen bore by a flow of preheat oxygen.

2. The cutting nozzle according to claim 1, wherein the inlet orifices of the air bores are open to an environment of the body, whereby ambient air is drawn into the preheat oxygen bore by the flow of preheat oxygen.

3. The cutting nozzle according to claim 1, comprising one of said air bore for each said preheat oxygen bore.

4. The cutting nozzle according to claim 1, wherein an orientation of the air bores is oblique relative to an orientation of the related preheat oxygen bore.

5. The cutting nozzle according to claim 4, wherein an angle of the orientation of the air bores relative to that of the related preheat oxygen bore is between 25 and 60 degrees, inclusively.

6. The cutting nozzle according to claim 5, wherein the plurality of bores are parallel to a longitudinal axis of the cutting nozzle.

7. The cutting nozzle according to claim 6, wherein inlets of the plurality of bores are in surfaces of the torch end of the body lying in planes to which a vector of the longitudinal axis is normal.

8. The cutting nozzle according to claim 1, wherein the cutting nozzle is monolithic.

9. The cutting nozzle according to claim 1, wherein the body includes a nozzle tip and a hollow retainer nut mounted onto the nozzle tip.

10. The cutting nozzle according to claim 9, wherein a group of the plurality of bores being fuel gas bores and a cutting oxygen bore are entirely located in the nozzle tip.

11. The cutting nozzle according to claim 10, wherein the discharge orifice of the cutting oxygen bore is centrally located in the discharge end, and the discharge orifices of the fuel gas bores are circumferentially distributed around the discharge orifice of the cutting oxygen bore.

12. The cutting nozzle according to claim 11, wherein the discharge orifice of the cutting oxygen bore flares into the discharge end.

13. The cutting nozzle according to claim 11, wherein the discharge orifices of the preheat oxygen bores are in the hollow retainer nut, and inlets of the preheat oxygen bores are in a flange of the nozzle tip.

14. The cutting nozzle according to claim 13, further comprising an annular chamber defined between the hollow retainer nut and the nozzle tip, the preheat oxygen bores disrupted by and in fluid communication with the annular chamber.

15. The cutting nozzle according to claim 1, wherein the peripheral surface includes a flaring segment flaring toward the discharge end, the inlet orifices of the plurality of air bores being in the flaring section.

16. The cutting nozzle according to claim 15, wherein the flaring segment is frustoconical.

17. The cutting nozzle according to claim 15, wherein the peripheral surface of the body includes a hexagonal rib, the flaring section merging with the hexagonal rib.

18. The cutting nozzle according to claim 1, further comprising a tubular shroud projecting from the discharge end and surrounding the discharge orifices of the plurality of bores.

19. The cutting nozzle according to claim 1, wherein the inlet orifices of the plurality of air bores are configured for being connected to a compressed air source.

\* \* \* \* \*